United States Patent Office 3,121,654
Patented Feb. 18, 1964

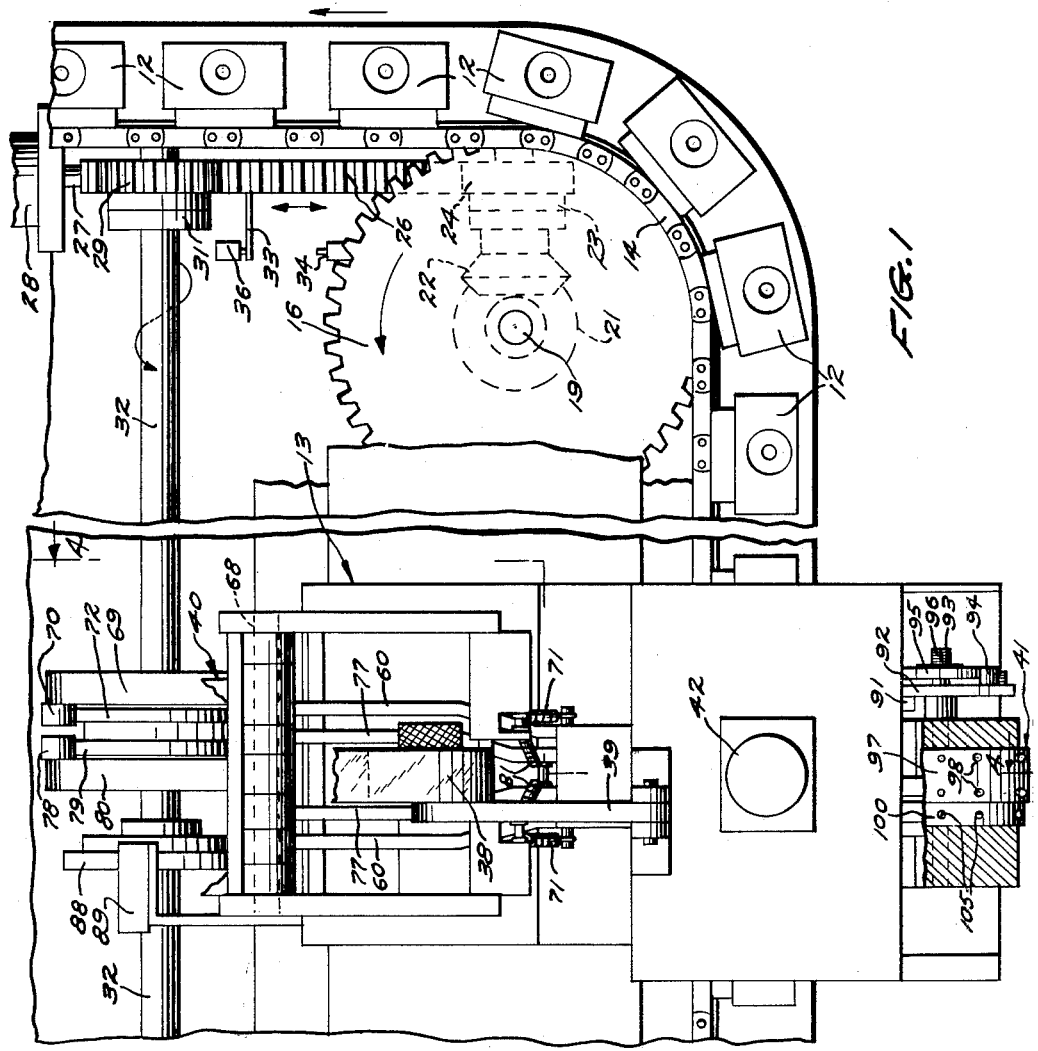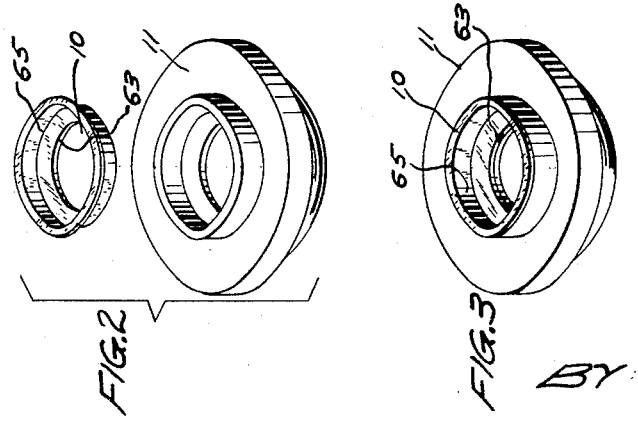

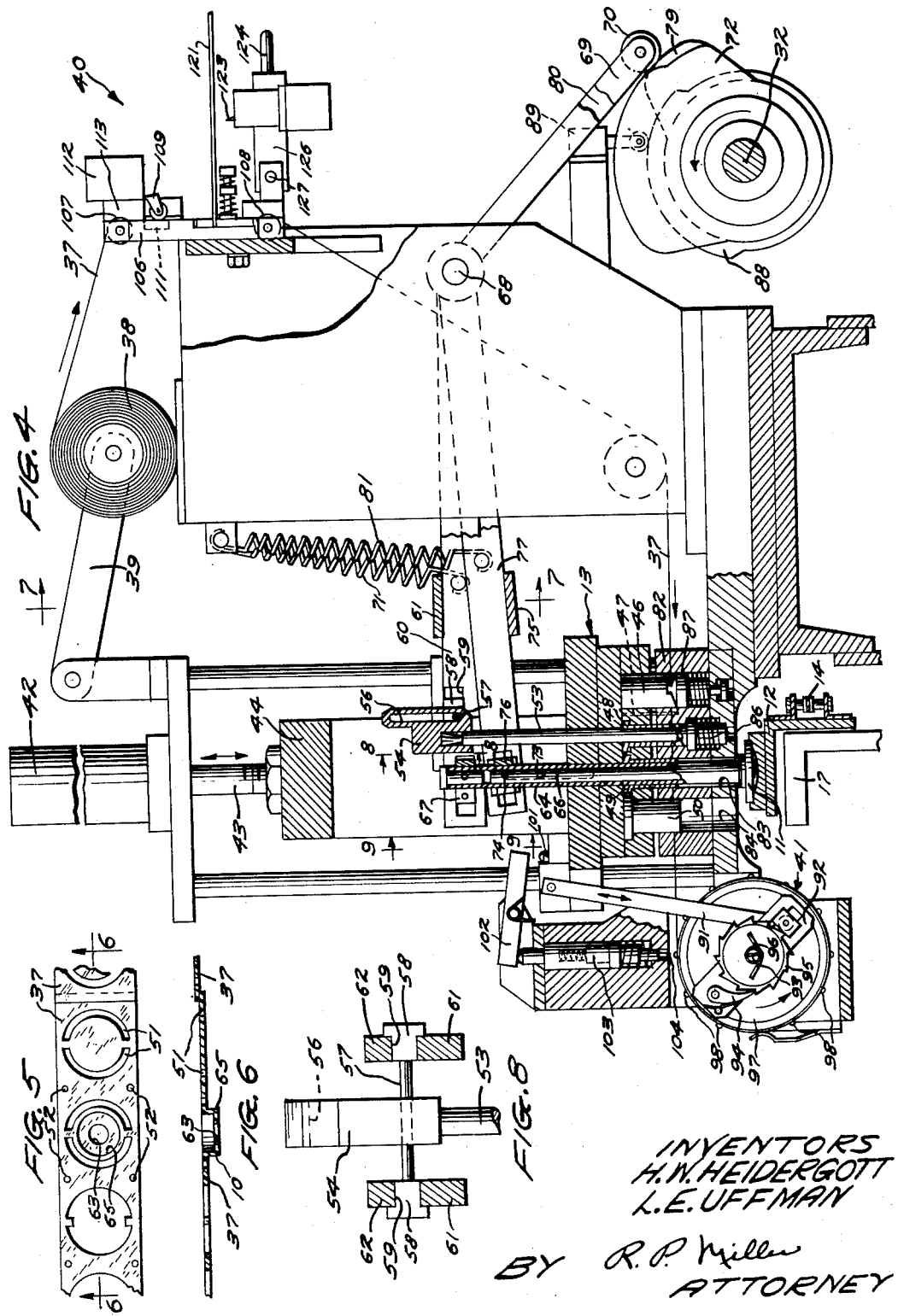

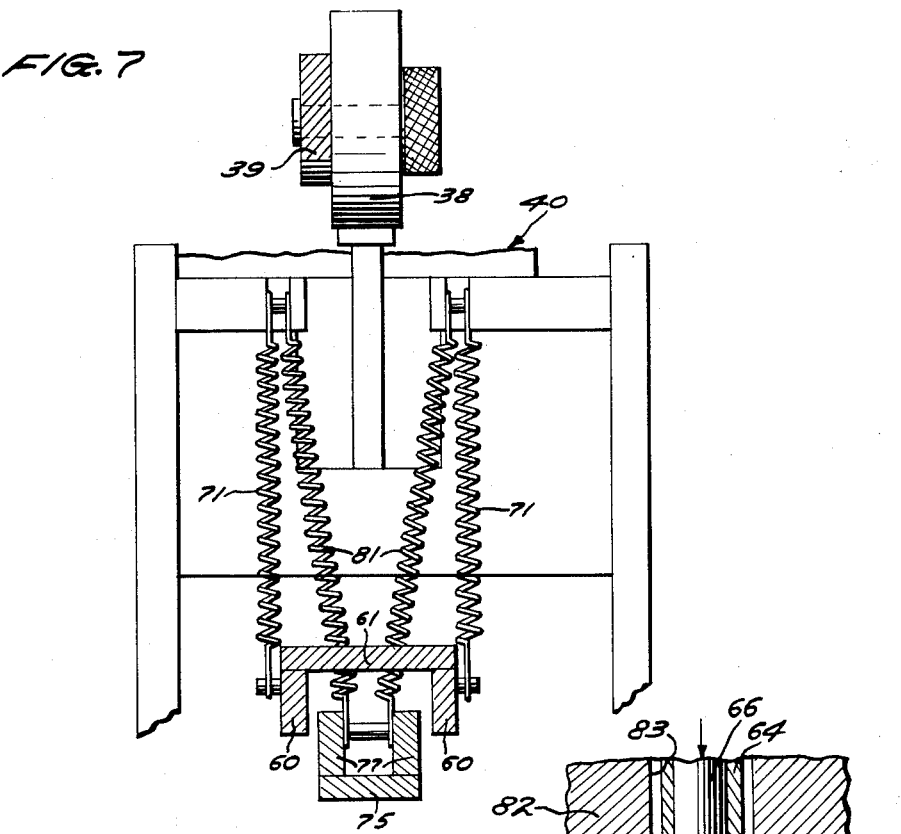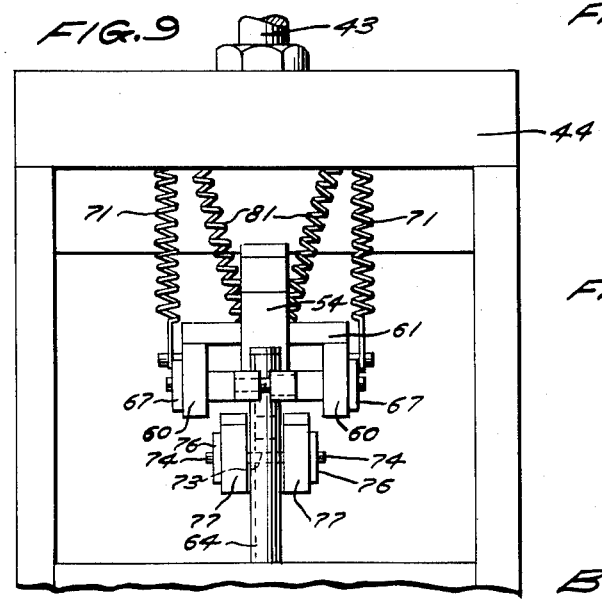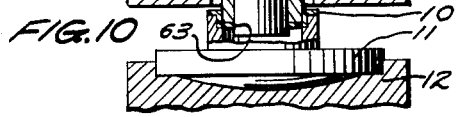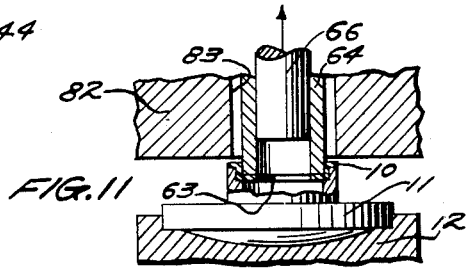

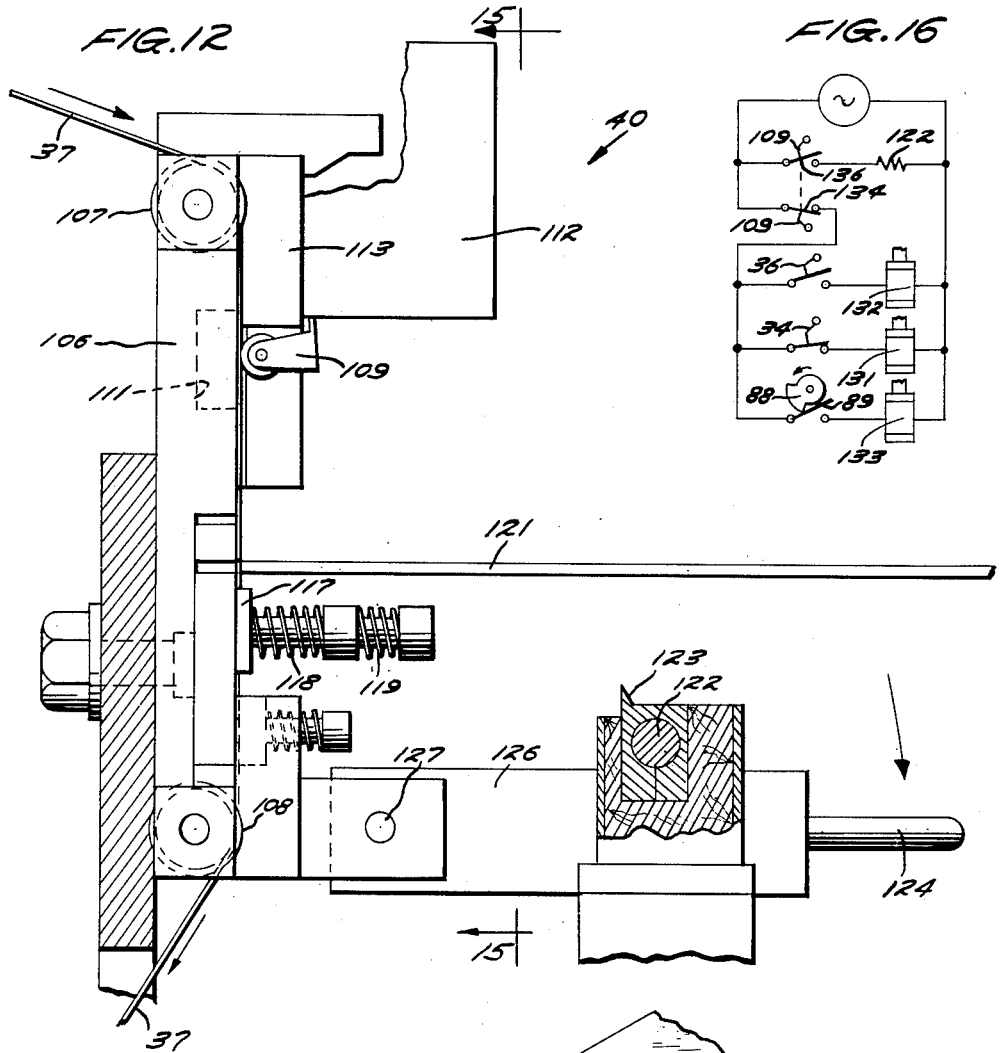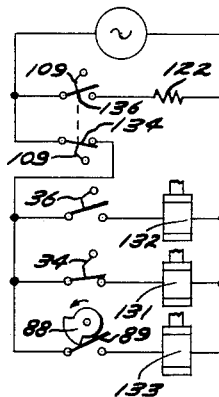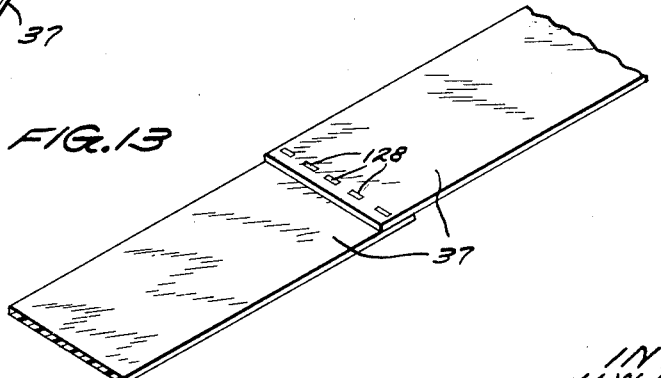

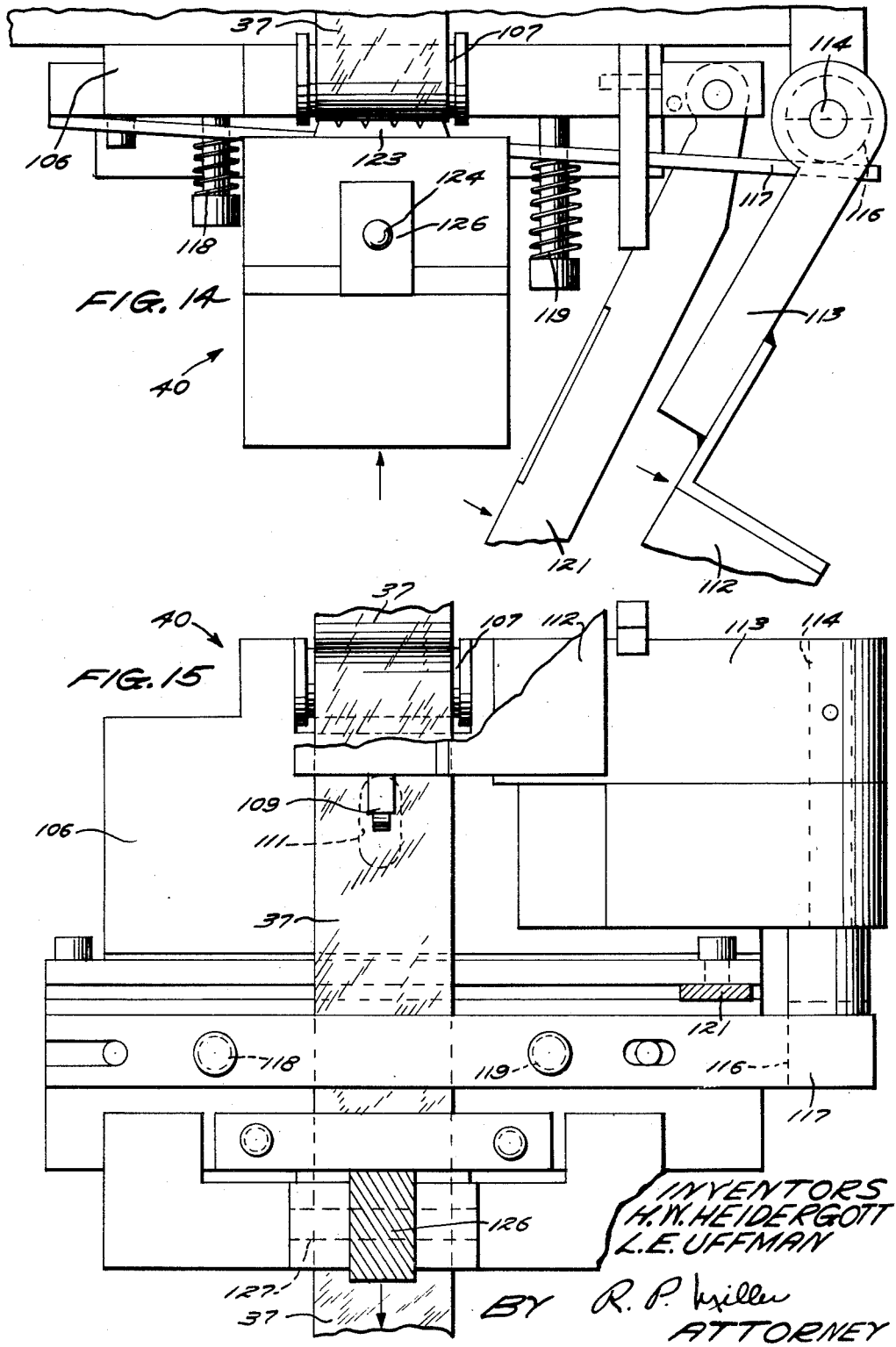

3,121,654
APPARATUS FOR CONTINUOUSLY FABRICATING ARTICLES FROM STRIP MATERIAL
Harry W. Heidergott and Leroy E. Uffman, Indianapolis, Ind., assignors to Western Electric Company, Incorporated, New York, N.Y., a corporation of New York
Filed Aug. 31, 1959, Ser. No. 837,224
3 Claims. (Cl. 156—502)

This invention relates to an apparatus for continuously fabricating articles from strip material and more particularly to an apparatus having progressive fabricating punches and dies together with facilities to fuse overlapping ends of strip material whereafter the punches and dies do not act upon the fused sections of strip material.

Ram operated progressive punches and dies have been utilized to successively fabricate articles from strip material. Generally these progressive punches and dies have depended upon the movement of the ram to control or operate the individual punches to perform the various punching and forming operations. In usual practice, whenever the strip material is exhausted a new strip of material is loaded into the progressive punch and die and the first few cycles of operation of the punches and dies do not produce completely fabricated articles because the punches and dies are progressively rendered effective to act upon the advancing strip. Further, in the use of these punches and dies, the usual practice has been to produce fabricated articles and then subsequently assemble the articles in an area remote from the punches and dies.

It is a prime object of this invention to provide new and improved apparatus for continuously fabricating articles from strip material.

Another object of the invention is the provision of a progressive punch and die operated by a combination of a reciprocating ram and a series of mechanisms independently controlled by a group of cams.

A further object of the invention resides in facilities cooperable with the progressive punch and die for fusing a new strip of material to the end of a strip of material previously worked upon so that the fused juncture between the strips is not worked upon by the individual punch and die elements.

Concomitant with the previous object of the invention, it is an additional object to associate fusing facilities with a progressive punch and die wherein the fusing facilities are conditioned for operation upon the sensing of the exhaustion of an advancing strip of material.

It is still a further object of the invention to associate a progressive punch and die with a positive strip feed mechanism that is operated by the reciprocation of the ram to accurately position the strip material with respect to a series of progressive punches and dies.

In addition, the invention has as an object the provision of a progressive punch and die operated in conjunction with a conveyor whereby the progressive punch and die continuously fabricates articles and assembles them on other articles positioned on the conveyor.

With these and other objects in view, the present invention contemplates a progressive punch and die that is cyclically operated to fabricate and assemble articles onto or into articles advanced by a conveyor system. A series of cams are utilized to not only initiate a movement of a ram in the progressive punch and die but also to control the movement of certain fabricating punches and assembling elements mounted within the ram. The movement of the ram controls a mechanism for positively moving strip material past the progressive punches and dies. In addition, another mechanism is operated by the ram to accurately position the fabricated sections of the strip material with respect to the individual punches and dies.

Associated with and spaced from the progressive die is a fusing device that is conditioned for operation immediately upon a sensing device detecting an exhaustion of the strip material being fed through the progressive punch and die. This fusing device may be selectively operated to fuse a new strip of material to the end of the exhausted strip in such a manner that upon resumption of the operation of the progressive punch and die, the individual punch and die elements will not act or work upon the juncture of the fused strips of material.

Other objects and advantages of the present invention will be apparent from the following detailed description when considered in conjunction with the accompanying drawings, wherein:

FIG. 1 is a top plan view of a progressive punch and die apparatus in conjunction with a conveyor system embodying the principles of the present invention;

FIG. 2 is a perspective view of a pair of articles that are fabricated and assembled by the apparatus shown in FIG. 1;

FIG. 3 is a perspective view of a pair of articles following fabrication and assembly by the apparatus shown in FIG. 1;

FIG. 4 is a sectional view taken along line 4—4 of FIG. 1, particularly illustrating the progressive punch and die apparatus together with a positive strip feed mechanism and a strip fusing device;

FIG. 5 is a top view of a strip of material that has been fused to a second strip of material together with a showing of the action of the individual punches and dies in fabricating an article;

FIG. 6 is a sectional view taken along line 6—6 of FIG. 5 depicting the overlapping relationship of a pair of fused strips of material;

FIG. 7 is a sectional view taken along line 7—7 of FIG. 4 showing a pair of spring-urged levers for operating a punch and an article severing and advancing mechanism;

FIG. 8 is an enlarged sectional view taken along line 8—8 of FIG. 4 illustrating a connection between an operating lever and a punch rod;

FIG. 9 is a partial side elevational view taken along line 9—9 of FIG. 4 showing connections between the spring-urged levers and the article severing and advancing mechanism;

FIGS. 10 and 11 are sectional views of the article severing and advancing mechanism in two positions assumed during each cycle of operation;

FIG. 12 is a view, partially cut away, of a device for fusing together the ends of two strips of material;

FIG. 13 is a perspective view of two strips of material fused together by the device shown in FIG. 12;

FIG. 14 is a front view of the fusing device shown in FIG. 12 particularly illustrating a strip severing knife and a strip sensing switch in unoperated positions;

FIG. 15 is a top view, partially cut away, taken along line 15—15 of FIG. 12 illustrating the sensing switch and a hold-down guide in operative positions, and FIG. 16 is a simplified electrical schematic diagram of a circuit for controlling the apparatus shown in the other views.

Referring first to FIGS. 2 and 3, the apparatus shown in the other figures is intended to fabricate and insert an apertured cup-shaped cap 10 within a previously fabricated article or bridge 11. The assembled cap and bridge are eventually utilized in the manufacture of a transmitter unit utilized in a telephone handset. The bridge 11 is fabricated from metal, whereas, the cap 10 is formed of thermoplastic material such as Mylar. The bridges 11 are loaded onto a series of carriers 12 that are cyclically indexed to an automatic cap forming and assembling apparatus generally designated by the reference numeral 13. The carriers 12 may be advanced through a series of other fabricating apparatuses and eventually to an ejector station of the type shown in a copending application of H. W. Heidergott, Serial No. 821,150, filed June 18, 1959, now Patent No. 3,045,819, and entitled "Article Advancing and Ejecting Apparatus."

Attention is now directed to FIGS. 1 and 4 where the carriers are shown as being attached to a chain 14 that is cyclically indexed by operation of a sprocket wheel 16 to move the carriers along a frame 17. The sprocket 16 is driven by a shaft 19 secured to a bevel gear 21 meshing with a bevel gear 22 that receives motion through a one-way clutch 23. Clutch 23 receives motion from a pinion 24 meshing with a rack 26. Attached to one end of the rack 26 is a piston rod 27 mounted within an air or hydraulic cylinder 28. This rack also functions to drive a pinion 29 that imparts motion through a one-way clutch 31 to drive a cam shaft 32. The one-way clutch may be of the type shown in the copending application of L. E. Uffman, Serial No. 781,540 filed December 19, 1958, now Patent No. 3,017,976, and entitled "Uni-Directional Clutch."

When the piston 27 moves from within the cylinder 28, the rack 26 is advanced to rotate the pinion 29 and drive the cam shaft 32 through the one-way clutch 31. Accompanying the advance of the rack is an advance of a switch actuator 33 that engages a switch 34 to operate a control circuit that functions to reverse the direction of air applied to the cylinder 28 whereupon the rack 26 moves toward the cylinder to rotate the pinion 24 and drive the bevel gear 22 through the one-way clutch 23. When motion is imparted to the bevel gear 22, the gear 21 and the shaft 19 are rotated to advance the sprocket 16 and the chain 14. Each movement of the chain is effective to advance another carrier 12 into the apparatus 13. When the piston 27 is drawn into the cylinder 28, the actuator 33 operates a switch 36 to again reverse the direction of air applied to the cylinder 28 thereby initiating another cycle of operation.

Thermoplastic strip material 37 is advanced from a roll 38 mounted on a pivot arm 39 past a sensing and fusing device generally referenced by the numeral 40, through the fabricating and assembling apparatus 13 to a takeup roll or strip feed device 41. The fabricating and assembling apparatus 13 includes an air or hydraulic cylinder 42 adapted to reciprocate a rod 43 attached to a ram 44. Secured to the lower portion of the ram 44 are a plurality of punches 46, 47, 48, 49 and 50 that function to successively perforate and fabricate each advanced area of the strip 37. The punch 46 severs two arcuate segments 51 (see FIG. 5) from the strip. The punches 47 form feed holes 52 in the strip.

Passing through the punch 48 is a punch rod 53 attached to a plate 54 (see FIGS. 4 and 8) having a slot 56 formed therein to receive a pin 57 extending from a pair of blocks 58 slidably mounted within slots 59 formed in a dual section lever 60 connected together by a plate 61 (see also FIG. 7). A bar 62 is attached to each section of the lever 60 to retain the blocks 58 within the slots 59. The punch 48 functions to draw the material 37 into a cup-like projection 65 (see FIG. 6). When motion is imparted to the lever 60, the pin 57 projecting from the blocks 58 moves the plate 54 and the punch rod 53 relative to the punch 48 whereupon an aperture 63 (see FIGS. 5 and 6) is formed in the bottom of the cup-like projection 65.

The punch 49 is cylindrical in shape and has slidably mounted therein an ejector comprising a stripper sleeve 64 into which is positioned a guide rod 66. The sleeve 64 is pivotally attached to a pair of flanged blocks 67 (see also FIG. 9) slidably mounted in slots formed in the dual section lever 60. The dual section lever 60 is pivotally mounted about a shaft 68 and is attached to an operating lever 69 which has mounted on the free extremity thereof a roller 70. A pair of springs 71 urge the levers 60 and 69 to move about the pivot shaft 68 to maintain the roller 70 in engagement with a cam 72. Sleeve 64 is provided with an elongated slot 73 within which rides a pin 74 attached to a pair of flanged blocks 76 slidably mounted in slots formed in a dual section lever 77 connected together by a plate 75. As is clearly seen in FIG. 4, the pin 74 extends through an opening in the guide rod 66. Lever 77 is positioned within the dual section lever 60 and is also pivotally mounted about shaft 68. Lever 77 is attached to an operating lever 80 (see FIG. 1) which is provided with a cam follower roller 78 that rides upon a cam 79. A pair of springs 81 are provided to continuously urge the roller 78 into engagement with the cam 79.

Positioned beneath the punches 46–50 is a die block 82 having suitable die openings to accommodate the punches. Die block 82 is provided with a bore 83 extending through the entire block in alignment with an article 11 positioned on a carrier 12 that has been moved within the apparatus 13. A second bore 84 also extends through the die block to receive the punch 50 that functions to remove scrap from the strip material 37. A pair of spring-biased push-off members 86 and 87 cooperate with the punches 46 and 48 to insure that the fabricated strip material 37 is not retained within the die block 82 upon subsequent operation of the strip feed device.

Recapitulating briefly on the overall operation of the progressive die following advance of a carrier 12 into the apparatus 13, the rack 26 moves forward to rotate the pinion 29 and transmit motion through the clutch 31 to the shaft 32. Shaft 32 has a cam 88 mounted thereon which rotates to close a switch 89 to complete an energizing circuit which controls the admission of air to the cylinder 42. The piston rod 43 and the ram 44 thereupon move down to advance the punches 46–50 into engagement with the various areas of the strip material 37. The punch 46 cooperates with the die block 82 and the push-off member 87 to cut two arcuate segments 51 out of the strip 37. The pair of feed hole punches 47 perforate feed holes 52 into the strip material 37. The forming punch 48 cooperates with the die block 82 and the push-off member 86 to form the cup-shaped portion 65 of the cap 10. When the levers 60 and 69 are operated by the cam 72, the pin 57 transmits motion to the plate 54 and the punch rod 53 to sever the strip 37 to form an aperture 63 in the center of the cap 10.

The punch 49 severs the completed cap 10 from the strip material 37. The cams 72 and 79 present lobed portions to the cam follower rollers 70 and 78 to pivot the levers 69 and 80, whereupon the stripper sleeve 64 and the guide rod 66 move toward the cap 10, the rod moving slightly relative to the sleeve and into the aperture 63 of the cap 10. The sleeve 64 and guide rod 66 now move in unison to advance the severed cap 10 through the bore 83 into the article 11. The cam 79 now presents a low portion to the follower 78 whereupon the lever 77 moves in an upward direction to withdraw the rod 66 from within the aperture 63 formed in the cap 10. The rod 66 is permitted to move relative to the sleeve 64 (see FIGS. 10 and 11) because of the slot 73 encompassing the pin 74 whereupon the sleeve 64 functions to strip the cap 10 from the rod. The cam 72 now presents a low portion to the cam follower roller 70 to permit the levers 69 and 60 to pivot under the urging of the spring 71. Motion is imparted through the block 67 to withdraw the sleeve 64 leaving the fabricated cup-shaped cap 10 within the article 11. When the lever 60 is restored to the initial position, the punch rod 53 is withdrawn from within the aperture 63 of the cap 10 because the fabricating punch 48 is still held in position by the ram and thus, engages the cup-shaped portion 65 of the cap 10. A low portion of the cam 88 is presented to the switch 89 thus releasing the switch and deenergizing the control circuit to reverse the direction of air applied to the cylinder 42 whereupon the ram 44 is restored to the initial position.

Considering now the drive means for the strip material feed device 41, there is attached to the ram 44 one end of a rod 91, the other end of which is attached to a bar 92 pivotally mounted on a shaft 93. A spring-urged pawl 94 is mounted on the bar 92 to engage a ratchet 95 attached through a spring 96 to a feed wheel 97 having a plurality of radially extending pairs of pins 98 that engage the strip material 37 within the feed holes 52. Attached to the feed wheel is a disc 100 having a plurality of bores 105 in lateral alignment with the feed pins 98. Mounted on the ram 44 is a stud 101 which engages and pivots a flat lever 102 to move a sleeve 103 toward the disc 100. Positioned within the sleeve 103 is a spring-urged rod 104 which moves within a bore 105 to accurately position the pins 98 and hence the strip material with respect to the punches and dies. The sleeve 103 moves with the rod 104 to provide added support for the rod 104 when the rod moves within a bore 105 to hold the disc 100 and the feed wheel 97 against movement by the pawl and ratchet. The drive means is designed to over drive each bore 105 past the rod 104 during each cycle of operation, but the rod 104 rides along the periphery of the disc and drops within a bore to hold the disc and feed wheel whereby the excess movement of the drive means will be taken up by the spring 96.

Attention is now directed to FIGS. 4, 12, 13, 14 and 15 wherein the details of the sensing and fusing device 40 are shown. This device comprises a stationary plate 106 fixed to the frame of the apparatus and having a pair of rollers 107 and 108 over which the strip material 37 is guided. A switch actuator 109 continuously engages the strip material 37 and upon sensing an exhaustion of the strip material, the switch actuator 109 moves into a slot 111 formed in the plate 106 whereupon a switch 112 is actuated to interrupt the power supply for the overall apparatus. Switch 112 is secured to a bracket 113 that is pivotally mounted about a stud bolt 114 thus permitting an attendant to pivot the switch 112 as shown in FIG. 14. The bracket 113 has a cam 116 secured thereto which cooperates with a hold-down plate 117. Plate 117 is normally urged by springs 118 and 119 toward the strip material 37 to hold the material against the guide plate 106. When the cam 116 pivots the plate 117, the strip material 37 is released from the plate 106. A knife 121 is pivotally mounted on the plate 106 and the attendant will move the knife 121 to sever the strip material 37. When the switch actuator 109 detects the exhaustion of the strip material 37, a circuit is completed to a heating device 122 having projecting fusing elements 123. By the time the attendant has loaded the end of a new strip of material over the guide roller 107 and into abutting relationship with the hold down plate 117 so as to overlap the severed end of the exhausted strip of material, the fusing elements 123 are heated to such an extent as to be capable of fusing the overlapping ends of thermoplastic material. The attendant will grasp a handle 124 and swing the fusing elements into engagement with the overlapping strips of material thereby fusing the new strip to the exhausted strip.

The heating device 122 is mounted in a bracket 126 that is pivotally mounted about a shaft 127. The fusing elements 123 are spaced projections which form stitch welds 128 in the overlapping sections of strip material 37. The location of the pivot shaft 127 is selected so that the heating elements 123 fuse the overlapping strips of material in such a fashion that upon resumption of operation of the overall apparatus the punches 46–50 will not operate upon the fused juncture. By this arrangement any possibility of an article 10 being formed from a fused juncture is eliminated. The feed hole punches 47 can be located so as to operate upon the juncture, but it is preferred that the feed holes be also punched in the non-fused sections of strip material.

The overall operation of the apparatus may be further understood by reference to the simplified circuit diagram shown in FIG. 16. Assume that the rack 26 has advanced so that the switch actuator 33 closes the switch 34 then a solenoid 131 is energized to reverse the direction of air applied to the cylinder 28. The rack 26 will move toward the cylinder 28 and a carrier 12 will be advanced into the apparatus 13, whereupon the switch actuator 33 closes the switch 36 to energize a solenoid 132 that functions to reverse the direction of air applied to the cylinder 28. The rack 26 will rotate the cam shaft to operate the apparatus 13. A cup-shaped cap 10 is fabricated from the strip 37 and inserted in the article 11 whereafter another cycle of the machine is automatically initiated by the subsequent closure of switch 34. When the shaft 32 rotates, the cam 88 closes the switch 89 to operate a solenoid 133 that controls the application of air to the cylinder 42 to move the ram 44 and the punches 46–50. Switch 89 is opened to deenergize the solenoid 133 to reverse the direction of air applied to the cylinder 42 prior to the time that the actuator 33 closes the switch 34 to initiate another cycle of operation. When the sensing switch actuator 109 ascertains an exhaustion of the strip material 37, contacts 134 are opened to interrupt further cyclic operation of the solenoids 131–133. Simultaneously therewith the actuator 109 closes contacts 136 to energize heating elements 122 to initiate a heating of the fusing elements 123 in anticipation of the attendant fusing a new strip of material to the exhausted strip.

It is to be understood that the above-described arrangements of apparatus and construction of elemental parts are simply illustrative of an application of the principles of the invention and many other modifications may be made without departing from the invention.

What is claimed is:

1. In progressive punch and die apparatus, a ram carrying a plurality of spaced punches cooperable with a plurality of dies to perform sequential operations on a strip of stock material, feed means intermittently actuated by movement of said ram for intermittently advancing stock material between said punches and dies, said feed means including a wheel having radially protruding pins for entering uniformly spaced apertures in said stock material, and perforating means carried by said ram for perforating said stock material while said stock material is maintained in prescribed position by said pins in cooperation with previously formed apertures.

2. In progressive punch and die apparatus having a plurality of spaced punches and dies for performing successive operations on strip material between intermittent movements of said material, and a ram for moving said punches toward and away from said dies; feed means intermittently actuated by movement of said ram for intermittently advancing stock material a prescribed distance between said punches and dies, said feed means including a wheel having radially protruding pins for entering uniformly spaced apertures in said stock material, perforating means carried by said ram for perforating said stock material while said stock material is maintained in prescribed position by said pins in cooperation with previously formed apertures, means for joining the trailing end of one strip of stock material to the overlapping leading end of another, and support means for moving said joining means into joining engagement with said overlapping strip ends only at a predetermined point along the path of movement of said strip material between intermittent movements of said material, the predetermined point being so located with respect to the punches and dies that the overlapping joined ends of said strip material will stop between adjacent ones of said punches between subsequent intermittent movements of said material.

3. In progressive punch and die apparatus having a plurality of spaced punches and dies for performing successive operations on strip material between intermittent movements of said material, means for intermittently advancing the strip material a prescribed distance between the punches and dies, means for severing the trailing end portion of the strip material at such a point along the length of the material that the severed end will stop between adjacent ones of the punches and dies between subsequent movements of the material, means for joining the severed end of one strip of material to the overlapping leading end of another, and support means for moving said joining means into joining engagement with the overlapping strip ends only at a predetermined point along the path of movement of said strip material between intermittent movements of said material, the latter predetermined point being so located with respect to the punches and dies that the overlapping joined ends of the strip material will stop between adjacent ones of said punches between subsequent intermittent movements of the material.

References Cited in the file of this patent

UNITED STATES PATENTS

| | | |
|---|---|---|
| 1,031,468 | Power | July 2, 1912 |
| 1,261,056 | Pfohl | Apr. 2, 1918 |
| 1,262,671 | Howell | Apr. 16, 1918 |
| 1,899,185 | Di Ianni | Feb. 28, 1933 |
| 1,921,808 | Cohn | Aug. 8, 1933 |
| 2,392,138 | Freeman | Jan. 1, 1946 |
| 2,435,376 | Wilcoxon | Feb. 3, 1948 |
| 2,618,311 | Parker | Nov. 18, 1952 |
| 2,649,125 | Poupitch | Aug. 18, 1953 |
| 2,940,507 | Butler | June 14, 1960 |

FOREIGN PATENTS

| | | |
|---|---|---|
| 477,662 | Great Britain | Jan. 4, 1938 |